US007764711B2

(12) United States Patent
Sudo

(10) Patent No.: US 7,764,711 B2
(45) Date of Patent: Jul. 27, 2010

(54) CDMA TRANSMISSION APPARATUS AND CDMA TRANSMISSION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 11/767,124

(22) Filed: Jun. 22, 2007

(65) Prior Publication Data
US 2007/0253506 A1 Nov. 1, 2007

Related U.S. Application Data

(63) Continuation of application No. 10/522,980, filed as application No. PCT/JP2004/006154 on Apr. 28, 2004, now Pat. No. 7,251,469.

(30) Foreign Application Priority Data
May 9, 2003 (JP) ............................. 2003-132133

(51) Int. Cl.
*H04J 1/00* (2006.01)
(52) U.S. Cl. ...................................... 370/480; 370/342
(58) Field of Classification Search ................. 370/342, 370/335, 441, 334, 336, 337, 343, 267, 347, 370/445, 265, 480, 208; 455/562.1, 575.7, 455/552.1, 553.1, 101–103, 132, 277.2, 561.2, 455/452.1, 452.2, 342; 375/299, 349, 347, 375/267, 265, 260
See application file for complete search history.

(56) References Cited

U.S. PATENT DOCUMENTS
5,504,775 A 4/1996 Chouly et al.

| 6,603,796 | B1 | 8/2003 | Kondo |
| 6,662,024 | B2 * | 12/2003 | Walton et al. ............ 455/562.1 |
| 6,751,187 | B2 * | 6/2004 | Walton et al. ............... 370/210 |
| 6,771,706 | B2 * | 8/2004 | Ling et al. .................. 375/267 |
| 6,778,612 | B1 | 8/2004 | Lozano et al. |

(Continued)

FOREIGN PATENT DOCUMENTS
JP 11275054 10/1999

(Continued)

OTHER PUBLICATIONS
PCT International Search Report dated Aug. 17, 2004.
(Continued)

*Primary Examiner*—Pablo N Tran
(74) *Attorney, Agent, or Firm*—Dickinson Wright, PLLC

(57) ABSTRACT

A control section (110) recognizes the type of data included in a transmission signal and outputs a control signal (C1) to an S/P conversion section (101) and a spreading control section (107). The S/P conversion section (101) apportions a specific type of data output from the control section (110) to different transmission systems. Spreading sections (102, 103) carry out spreading processing on the specific type of data output from the S/P conversion section (101) with different spreading codes assigned thereto under the control of the spreading control section (107). The data output from the spreading sections (102, 103) is transmitted by radio through addition sections (104-1, 104-2), transmission sections (105-1, 105-2) and antennas (106-1, 106-2). In this way, it is possible to improve the reception performance on the receiving side for specific data while maintaining the transmission efficiency of an MIMO communication system.

6 Claims, 5 Drawing Sheets

U.S. PATENT DOCUMENTS

| | | | |
|---|---|---|---|
| 6,850,741 B2 * | 2/2005 | Lei et al. | 455/101 |
| 6,907,270 B1 * | 6/2005 | Blanz | 455/562.1 |
| 6,987,819 B2 | 1/2006 | Thomas et al. | |
| 7,020,110 B2 * | 3/2006 | Walton et al. | 370/334 |
| 7,027,523 B2 | 4/2006 | Jalali et al. | |
| 7,050,510 B2 | 5/2006 | Foschini et al. | |
| 7,069,050 B2 * | 6/2006 | Yoshida | 455/562.1 |
| 7,113,558 B2 | 9/2006 | Lozano et al. | |
| 7,120,395 B2 * | 10/2006 | Tong et al. | 455/101 |
| 7,167,690 B2 * | 1/2007 | Baker et al. | 455/101 |
| 7,269,403 B1 * | 9/2007 | Miao | 455/402 |
| 7,324,481 B2 * | 1/2008 | Kobayashi et al. | 370/334 |
| 7,349,439 B2 * | 3/2008 | Lakkis | 370/480 |
| 7,545,832 B2 * | 6/2009 | Ito et al. | 370/480 |
| 2001/0053143 A1 | 12/2001 | Li et al. | |
| 2002/0191535 A1 | 12/2002 | Sugiyama et al. | |
| 2004/0208258 A1 | 10/2004 | Lozano et al. | |
| 2005/0002421 A1 | 1/2005 | Ito | |
| 2005/0063345 A1 | 3/2005 | Wu et al. | |
| 2005/0265465 A1 | 12/2005 | Hosur et al. | |
| 2006/0083291 A1 | 4/2006 | Hongming et al. | |
| 2006/0159160 A1 | 7/2006 | Kim et al. | |
| 2006/0189280 A1 | 8/2006 | Goldberg | |
| 2006/0250941 A1 | 11/2006 | Onggosanusi et al. | |
| 2006/0285585 A1 | 12/2006 | Sampath | |
| 2006/0291581 A1 | 12/2006 | Onggosanusi et al. | |

FOREIGN PATENT DOCUMENTS

| | | |
|---|---|---|
| JP | 2002044051 | 2/2002 |
| JP | 2002124899 | 4/2002 |
| JP | 2002374224 | 12/2002 |
| JP | 2003032226 | 1/2003 |
| JP | 2004-350259 | 12/2004 |

OTHER PUBLICATIONS

D. Samardzija, et al.; "Performance Evaluation of the VBLAST Algorithm in W-CDMA Systems," Vehicular Technology Conference 2001, Fall, vol. 2, Oct. 11, 2001, pp. 723-727.

M. Chen, et al.; "Space-time Codes of Multi-code Transmission for WCDMA," Vehicular Technology Conference 2001, Spring, vol. 2, May 9, 2001, pp. 1311-1313.

Japanese Office Action dated Nov. 11, 2008 with English translation thereof.

* cited by examiner

CDMA TRANSMISSION APPARATUS AND CDMA TRANSMISSION METHOD This is a continuation of application Ser. No. 10/522,980 filed Feb. 2, 2005, the entire content of which is expressly incorporated by reference herein.

TECHNICAL FIELD

The present invention relates to a transmission apparatus and transmission method which transmits signals from a plurality of transmission antennas like an MIMO (Multi-Input/Multi-Output) communication and adopts a CDMA (Code Division Multiple Access) scheme.

BACKGROUND ART

An MIMO (Multi-Input/Multi-Output) communication is attracting attention as a technology for realizing communications of large-volume data such as images in recent years. In the MIMO communication, different items of transmission data (substreams) are transmitted from a plurality of antennas on a transmitting side and the plurality of items of transmission data mixed along a propagation path is separated into the original items of transmission data on a receiving side using a propagation path estimated value (e.g. see FIG. 4 in the Unexamined Japanese Patent Publication No. 2002-44051).

In the MIMO communication, a signal transmitted from a transmission apparatus is actually received by at least the same number of antennas as transmission apparatuses and characteristics of propagation paths between the antennas are estimated based on pilot signals inserted in the signals received by the respective antennas. When, for example, there are two antennas on the transmitting side and two reception antennas, this estimated propagation path characteristic H is expressed by a matrix with 2 rows×2 columns. In the MIMO communication, transmission signals transmitted from the respective transmission antennas are obtained based on an inverse matrix of this propagation path characteristic H and received signals obtained from the respective reception antennas.

Thus, in the MIMO communication, it is possible to separate signals sent from a plurality of transmission antennas at the same timing and same frequency in substream units on the receiving side, and thereby transmit an amount of data proportional to the number of transmission antennas and realize a high-speed, high-volume communication.

However, a reception apparatus which carries out a conventional MIMO communication has a problem that when an interference compensation error occurs due to influences of noise, etc., in a process of separating (compensating for interference) a plurality of items of transmission data, the error rate characteristic of reception data deteriorates. Deterioration of an error rate characteristic of data expected to have higher channel quality than that of other data such as data directed to users having poor channel quality, control information of a communication system or retransmission information in particular has a greater influence on the communication system.

In order to prevent deterioration of the error rate characteristic of reception data due to the interference compensation error, a method of transmitting specific data assigned to only one antenna and a method of transmitting the same data assigned to a plurality of antennas are available. However, using such methods contrarily reduces the transmission rate of the communication system, causing a problem that the data transmission efficiency deteriorates.

DISCLOSURE OF INVENTION

It is an object of the present invention to improve reception performance of specific data on a receiving side while maintaining the transmission efficiency of a communication system.

This object can be attained with a CDMA transmission apparatus which transmits different code division multiplexed signals from a plurality of transmission antennas by apportioning specific data to a plurality of antennas and spreading/modulating the specific data with different spreading codes assigned thereto before being transmitted.

BEST MODE FOR CARRYING OUT THE INVENTION

With reference now to the attached drawings, an embodiment of the present invention will be explained in detail below.

Embodiment 1

Figure 1:
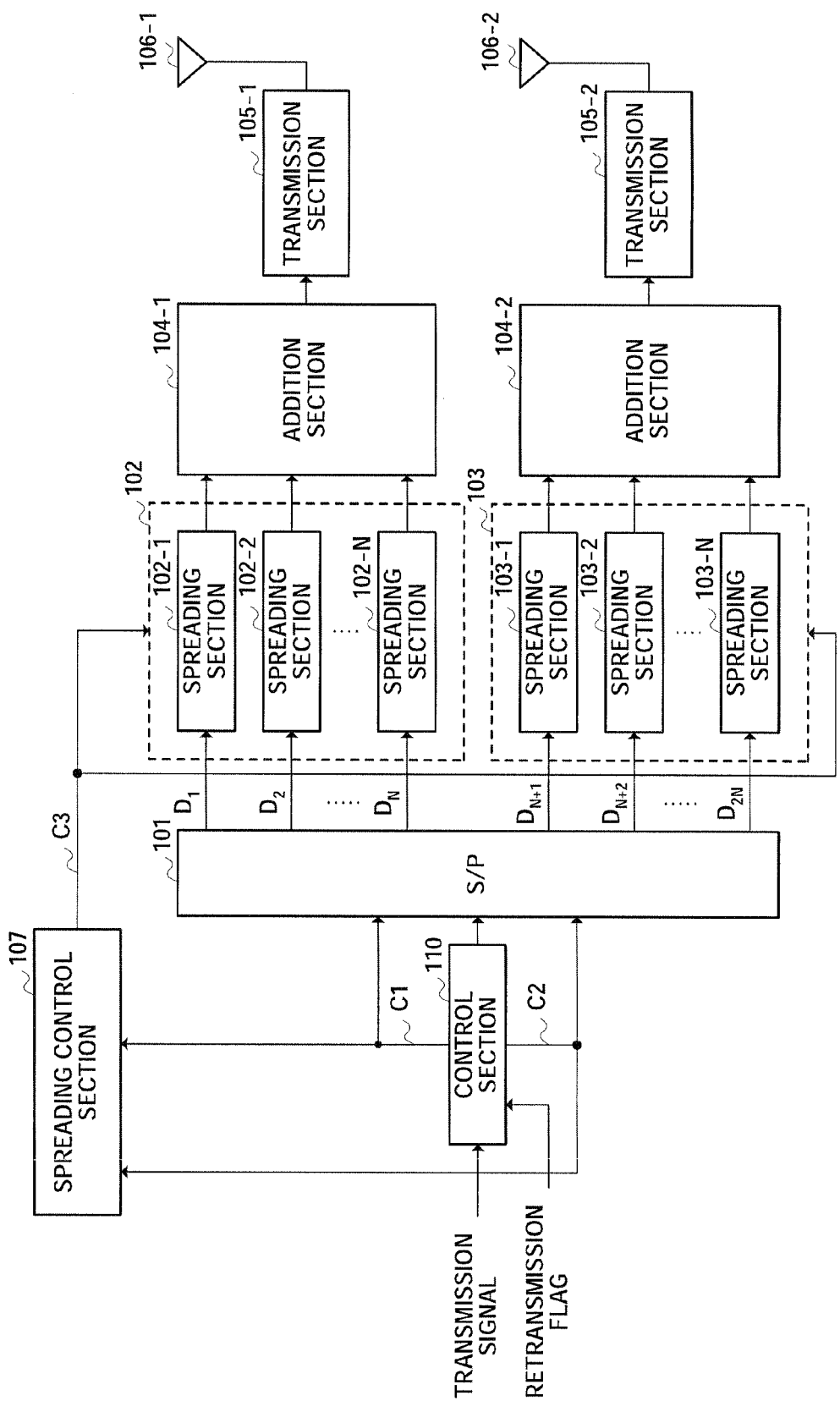
FIG. 1 is a block diagram showing the main configuration of a CDMA transmission apparatus according to Embodiment 1 of the present invention.

FIG. 1 is a block diagram showing the main configuration of a CDMA transmission apparatus according to Embodiment 1 of the present invention. Here, a case where this CDMA transmission apparatus has two antennas will be explained as an example, but the number of antennas is not limited to 2 and the number of antennas can be 3 or more.

This CDMA transmission apparatus is provided with an S/P conversion section 101, spreading sections 102 (102-1 to 102-N), 103 (103-1 to 103-N), addition sections 104-1, 104-2, transmission sections 105-1, 105-2, antennas 106-1, 106-2, a spreading control section 107 and a control section 110. Of these sections, suppose the sections from the spreading sections 102 to the antenna 106-1 are collectively called a "first transmission system" while the sections from the spreading sections 103 to the antenna 106-2 are collectively called a "second transmission system."

In FIG. 1, a transmission signal including data $D_1, D_2, \ldots, D_N, D_{N+1}, \ldots, D_{2N}$ to be sent to users $1, 2, \ldots, N, N+1, \ldots, 2N$ (that is, the number of users is 2N) is input to the control section 110.

The control section 110 recognizes the type of data included in the transmission signal input, and then outputs the transmission signal to the S/P conversion section 101. Furthermore, the control section 110 outputs a control signal C1 to the S/P conversion section 101 and spreading control section 107 according to the type of data recognized. Furthermore, the control section 110 outputs a control signal C2 to the S/P conversion section 101 and spreading control section 107 according to a retransmission flag notified from a reception section (not shown) which has received a retransmission request from the receiving side. A more specific operation of the control section 110 will be explained later.

The S/P conversion section 101 converts the transmission signal output from the control section 110 to parallel data separated for each transmission system and outputs the parallel data to their corresponding spreading sections 102-1 to 102-N and spreading sections 103-1 to 103-N.

In the case of the spreading section 102, the spreading sections 102-1 to 102-N corresponding to the respective parallel data output from the S/P conversion section 101 carry out spreading processing on the respective data under the control of the spreading control section 107 and output the spread data to the addition section 104-1. Likewise, in the case of the spreading section 103, the spreading sections 103-1 to 103-N corresponding to the respective parallel data output from the S/P conversion section 101 carry out spreading processing on the respective data under the control of the spreading control section 107 and output the spread data to the addition section 104-2.

The addition sections 104-1, 104-2 add up (multiplex) the parallel data output from the respective spreading sections 102, 103 and output the addition results to the transmission sections 105-1, 105-2.

The transmission sections 105-1, 105-2 carry out predetermined radio transmission processing such as up-conversion, etc., on the multiplexed signals output from the addition sections 104-1, 104-2 and send this data through the antennas 106-1, 106-2 by radio.

Figure 2:
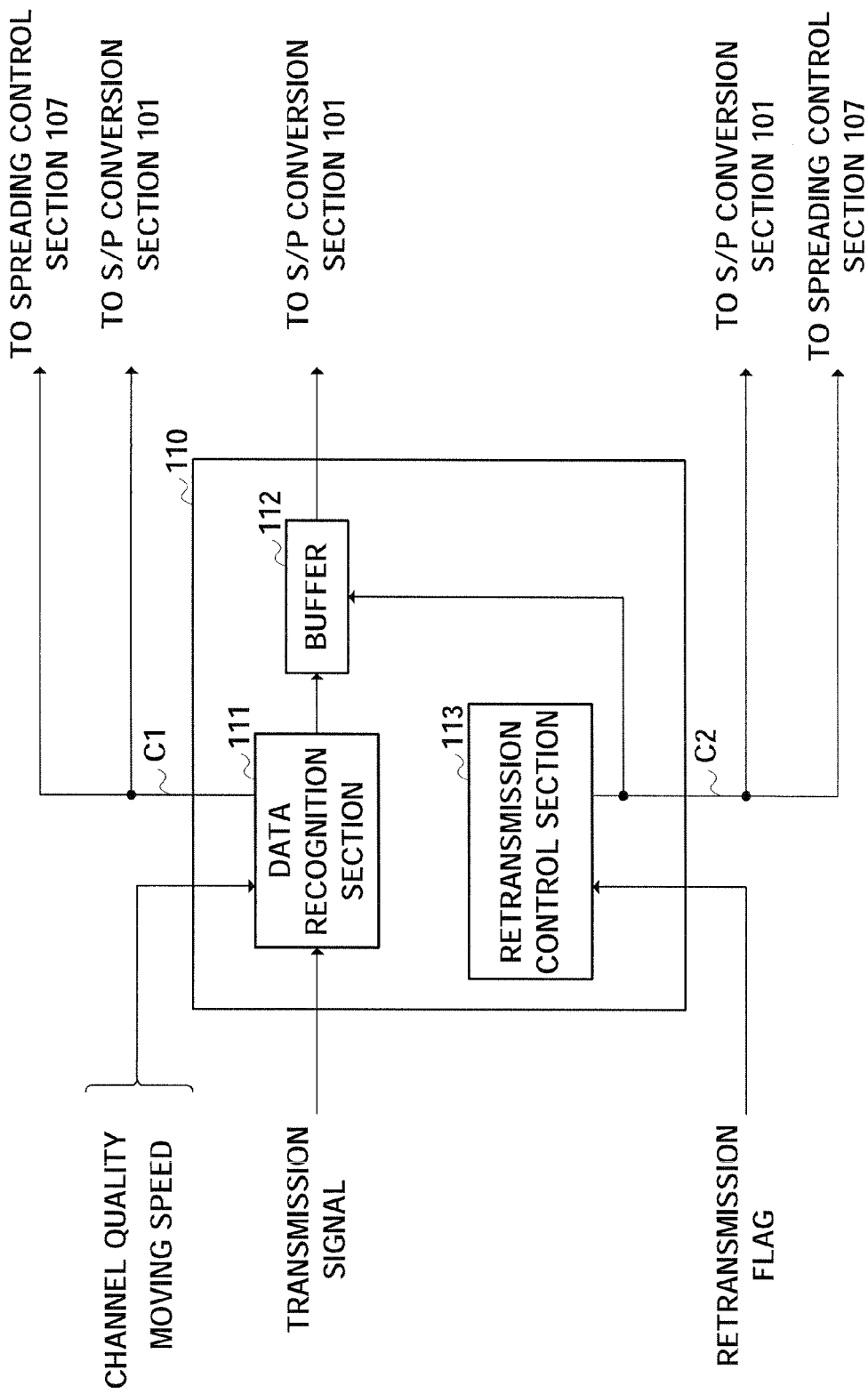
FIG. 2 is a block diagram showing the main internal configuration of a control section according to Embodiment 1 of the present invention.

FIG. 2 is a block diagram showing the main internal configuration of the control section 110. The control section 110 includes a data recognition section 111, a buffer 112 and a retransmission control section 113.

The data recognition section 111 recognizes the type of data included in the transmission signal based on the channel quality and moving speed on the receiving side output from the channel quality measuring section and moving speed measuring section (both are not shown) and then writes the transmission signal in the buffer 112. Furthermore, the data recognition section 111 outputs the control signal C1 to the S/P conversion section 101 and spreading control section 107 according to the recognized type of data. The retransmission control section 113 outputs the control signal C2 to the S/P conversion section 101 and buffer 112 according to the retransmission flag notified from the reception section (not shown) which has received a retransmission request from the receiving side. The buffer 112 outputs the buffered data to the S/P conversion section 101 based on the control signal C2 output from the retransmission control section 113.

Next, the operation of the CDMA transmission apparatus in the above described configuration will be explained.

The recognition processing on the above described type of data carried out by the data recognition section 111 refers to processing of recognizing and distinguishing data to which the CDMA transmission apparatus according to this embodiment gives higher priority in transmission (hereinafter referred to as "specific data") from other data. Here, the specific data more specifically refers to a control signal for controlling a communication with the receiving side or data to be transmitted now to the receiving side having poor channel quality (channel quality of a predetermined level or lower) or the receiving side having a higher moving speed (moving speed of a predetermined level or higher). The data recognition section 111 notifies the S/P conversion section 101 and spreading control section 107 of specific data information indicating which data is specific data using the control signal C1.

The specific data also includes data whose retransmission is requested by the receiving side (retransmission data) or data having a large retransmission count (retransmission count is equal to or higher than a predetermined count). The specific data is notified by the retransmission control section 113 to the S/P conversion section 101 and spreading control section 107 using the control signal C2.

The S/P conversion section 101 apportions the transmission data output from the control section 110 to the spreading sections 102-1 to 102-N, 103-1 to 103-N based on the specific data information notified by the control signals C1, C2. When the transmission data is not specific data but data indicating simple information, the transmission data is apportioned substantially equally to the respective spreading sections to improve the transmission efficiency. On the other hand, when the transmission data is specific data, this data is read from the buffer 112 at least twice and this data is apportioned so as to be transmitted using both of the first transmission system and second transmission system or more transmission systems (at least two transmission systems when there are three or more transmission systems).

The spreading control section 107 controls the spreading sections 102, 103 using a control signal C3 so that the specific data apportioned to the first transmission system and second transmission system is spread/modulated using different spreading codes (differing between the first transmission system and second transmission system).

The specific data and other data spread/modulated by the respective spreading sections are multiplexed by the addition sections 104-1, 104-2 for each transmission system and transmitted by radio through the transmission sections 105-1, 105-2 and antennas 106-1, 106-2.

Figure 3:
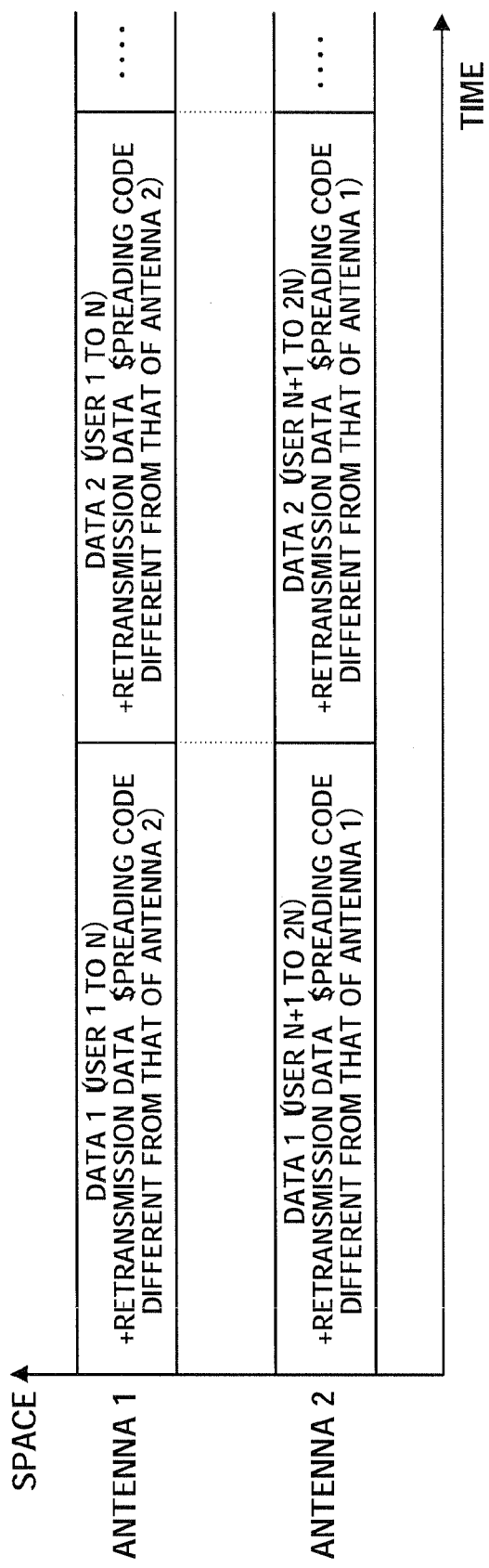
FIG. 3 illustrates an example of the configuration of a transmission signal of the CDMA transmission apparatus according to Embodiment 1 of the present invention.

FIG. 3 illustrates an example of the configuration of a transmission signal of the CDMA transmission apparatus according to this embodiment. Here, a case where the specific data is retransmission data will be explained as an example.

As shown in this figure, data 1 transmitted at a first transmission timing is data directed to user 1 to user 2N and the data 1 directed to user 1 to user N is transmitted from the first transmission system (antenna 1), while the data 1 directed to user (N+1) to user 2N is transmitted from the second transmission system (antenna 2). The above described data is not specific data. On the other hand, retransmission data is also transmitted accompanying the data 1. This retransmission data is specific data, apportioned to the first transmission system and second transmission system based on the configuration of the CDMA transmission apparatus according to this embodiment and spread/modulated using different spreading codes. Data 2 which is transmitted at the next transmission timing also has the same configuration as that of the data 1 as shown in the figure.

Figure 4:
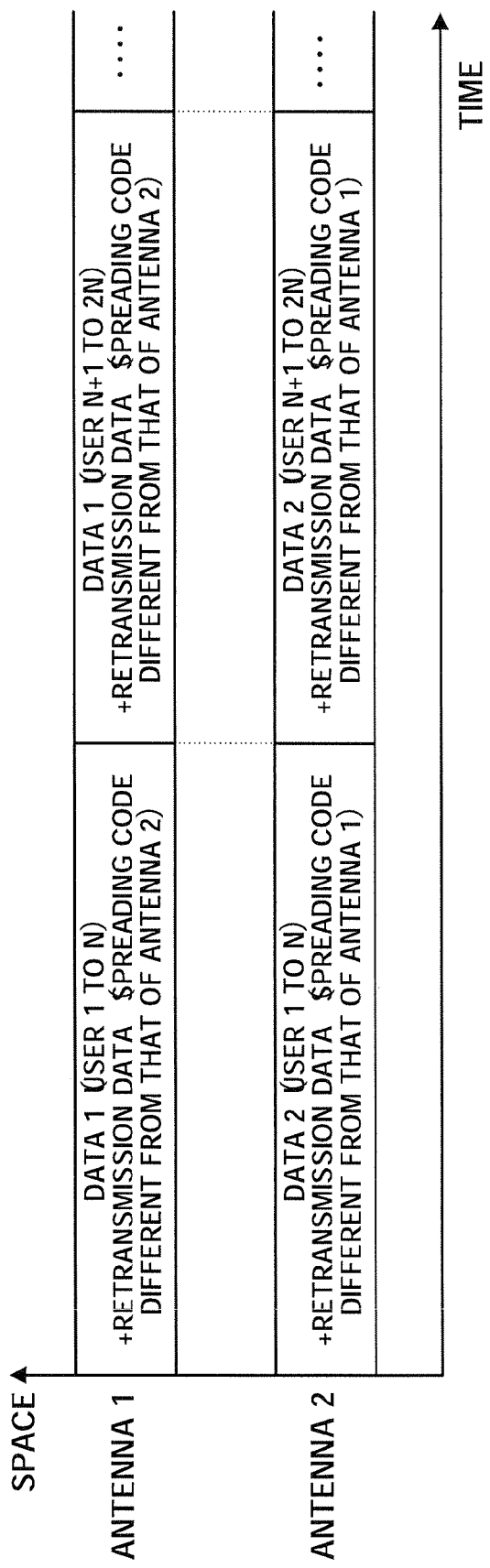
FIG. 4 illustrates another example of the configuration of a transmission signal of the CDMA transmission apparatus according to Embodiment 1 of the present invention.

FIG. 4 illustrates another example of the configuration of a transmission signal of the CDMA transmission apparatus according to this embodiment. Here, a case where the data 1 directed to user 1 to user N and the data 2 likewise directed to user 1 to user N are transmitted simultaneously at a first transmission timing using the first transmission system (antenna 1) and second transmission system (antenna 2). As with the case described above, the data is not specific data. On the other hand, retransmission data is also transmitted accompanying the data 1 and data 2. This retransmission data is specific data, apportioned to the first transmission system and second transmission system based on the configuration of the CDMA transmission apparatus according to this embodiment and spread/modulated using different spreading codes. The data transmitted at the next transmission timing is data directed to user (N+1) to user 2N as shown in the figure.

Figure 5:
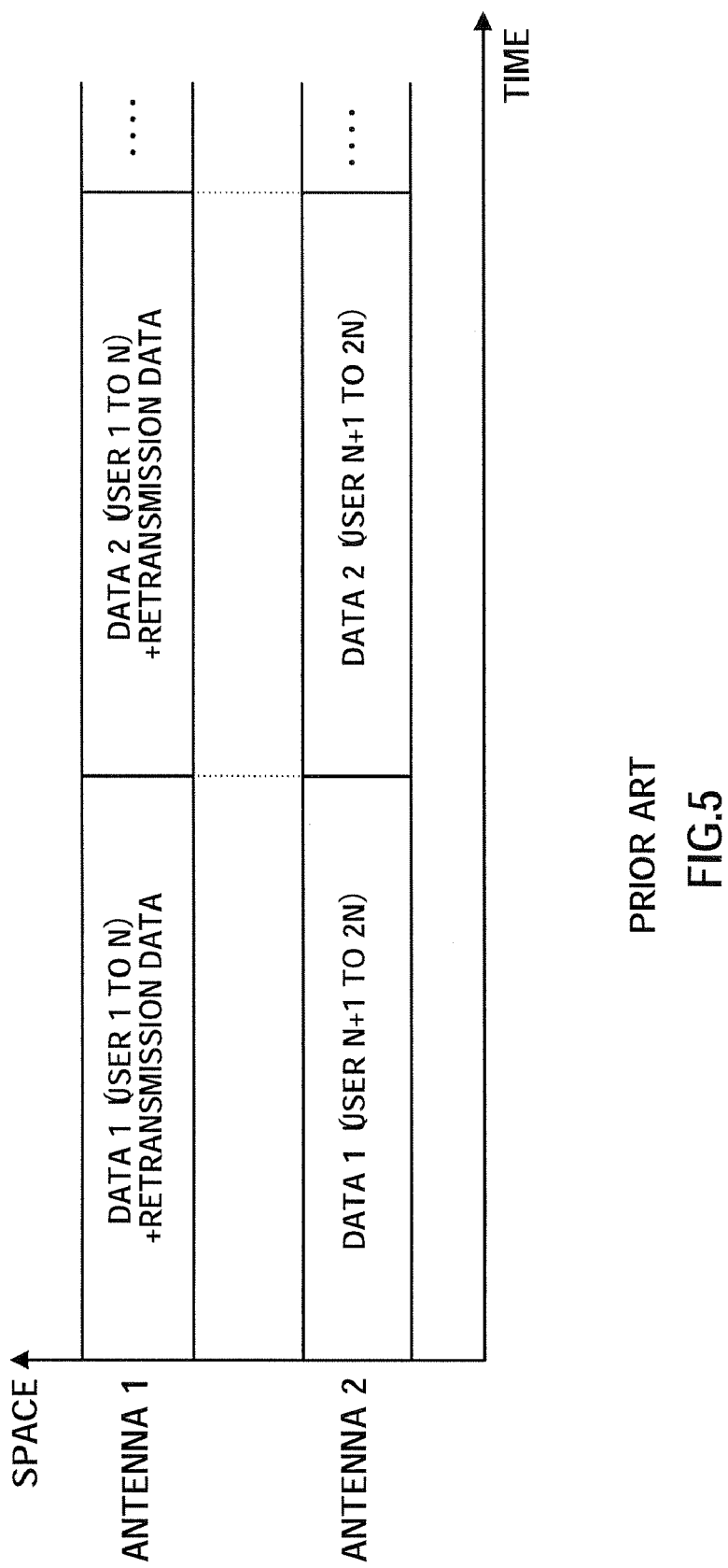
FIG. 5 illustrates an example of the configuration of a signal transmitted by a conventional CDMA transmission apparatus.

FIG. 5 illustrates an example of the configuration of a signal transmitted by a conventional CDMA transmission apparatus under the same condition settings as those described above. For example, when an interference compensation error occurs in a signal transmitted from the antenna 1, retransmission data results in a reception error, and therefore the transmitting side further repeats retransmission, which deteriorates the transmission efficiency of the communication system.

As explained above, the CDMA transmission apparatus according to this embodiment uses two transmission systems to transmit different items of data, and thus maintains high transmission efficiency which is an original feature of an MIMO communication. On the other hand, for data to be transmitted with higher priority, two transmission systems (at least two transmission systems when there are three or more transmission systems) are always used and such data is spread/modulated using different spreading codes, and therefore it is possible to separate signals through despreading processing even when an interference compensation error increases due to influences of a mixture of noise, etc., on the receiving side, that is, when sufficient separation performance using the MIMO technology cannot be obtained.

Thus, this embodiment can improve the reception performance on the receiving side for specific data while maintaining the transmission efficiency of the communication system.

When a turbo code is used as an error correcting code for the CDMA transmission apparatus according to this embodiment, systematic bits can also be used as the specific data. When turbo decoding is performed using systematic bits and parity bits, the systematic bits have large influences on the error rate characteristic of the data after the turbo decoding. Therefore, using systematic bits as the specific data can improve the reception quality of the systematic bits and can improve the error rate characteristic of the data after the turbo decoding.

Furthermore, when transmit power control is performed, transmit power may also be used instead of channel quality. This is because when transmit power control is performed, in the case of poor channel quality, the transmit power must also have increased according to the channel quality.

Furthermore, a retransmission count of data can also be used instead of the channel quality. This is because in the case of poor channel quality, the retransmission count of data must also have increased.

The CDMA transmission apparatus according to the present invention is also applicable to a transmission apparatus using a multicarrier scheme such as an OFDM (Orthogonal Frequency Division Multiplex), and can thereby provide a multicarrier transmission apparatus having operations and effects similar to those described above. A transmission scheme using multicarriers has a symbol rate set to a low level (long symbol length) and has the effect of reducing interference among codes due to multipaths in a multipath environment. Furthermore, by inserting guard intervals, it is also possible to remove interference among codes due to multipaths.

Here, the case where the components of the present invention are incorporated in one CDMA transmission apparatus has been explained as an example, but the present invention is also applicable to a case where spreading sections 102 to antenna 106-1, spreading sections 103 to antenna 106-2, spreading control section 107, and control section 110 are incorporated in different apparatuses, constituting one communication system as a whole.

Furthermore, an MIMO communication has been explained as an example here, but the present invention is not limited to the MIMO communication and is also applicable to a case where different items of data are transmitted in parallel from a plurality of antennas (transmission systems).

The CDMA transmission apparatus according to the present invention can be mounted on a communication terminal apparatus and base station apparatus in a mobile communication system, and can thereby provide a communication terminal apparatus and base station apparatus having operations and effects similar to those described above.

Here, the case where the present invention is constructed by hardware has been explained as an example, but the present invention can also be implemented by software.

As described above, the present invention can improve reception performance on the receiving side for specific data while maintaining the transmission efficiency of the communication system.

This application is based on the Japanese Patent Application No. 2003-132133 filed on May 9, 2003, entire content of which is expressly incorporated by reference herein.

INDUSTRIAL APPLICABILITY

The present invention is applicable to a transmission apparatus and transmission method, etc., which transmits signals from a plurality of transmission antennas like an MIMO communication and adopts a CDMA scheme.

[FIG. 1]
107 SPREADING CONTROL SECTION
TRANSMISSION SIGNAL
RETRANSMISSION FLAG
110 CONTROL SECTION
102-1 SPREADING SECTION
102-2 SPREADING SECTION
102-N SPREADING SECTION
103-1 SPREADING SECTION
103-2 SPREADING SECTION
103-N SPREADING SECTION
104-1 ADDITION SECTION
104-2 ADDITION SECTION
105-1 TRANSMISSION SECTION
105-2 TRANSMISSION SECTION
[FIG. 2]
CHANNEL QUALITY
MOVING SPEED
TRANSMISSION SIGNAL
RETRANSMISSION FLAG
111 DATA RECOGNITION SECTION
113 RETRANSMISSION CONTROL SECTION
112 BUFFER
TO SPREADING CONTROL SECTION 107
TO S/P CONVERSION SECTION 101
TO S/P CONVERSION SECTION 101
TO S/P CONVERSION SECTION 101
TO SPREADING CONTROL SECTION 107
[FIG. 3]
SPACE
ANTENNA 1
ANTENNA 2
DATA 1 (USER 1 TO N)+RETRANSMISSION DATA (SPREADING CODE DIFFERENT FROM THAT OF ANTENNA 2)
DATA 1 (USER N+1 TO 2N)+RETRANSMISSION DATA (SPREADING CODE DIFFERENT FROM THAT OF ANTENNA 1)
DATA 2 (USER 1 TO N)+RETRANSMISSION DATA (SPREADING CODE DIFFERENT FROM THAT OF ANTENNA 2)
DATA 2 (USER N+1 TO 2N)+RETRANSMISSION DATA (SPREADING CODE DIFFERENT FROM THAT OF ANTENNA 1)

TIME

[FIG. 4]

SPACE

ANTENNA 1
ANTENNA 2
DATA 1 (USER 1 TO N)+RETRANSMISSION DATA (SPREADING CODE DIFFERENT FROM THAT OF ANTENNA 2)
DATA 2 (USER 1 TO N)+RETRANSMISSION DATA (SPREADING CODE DIFFERENT FROM THAT OF ANTENNA 1)
DATA 1 (USER N+1 TO 2N)+RETRANSMISSION DATA (SPREADING CODE DIFFERENT FROM THAT OF ANTENNA 2)
DATA 2 (USER N+1 TO 2N)+RETRANSMISSION DATA (SPREADING CODE DIFFERENT FROM THAT OF ANTENNA 1)
TIME

[FIG. 5]

SPACE

ANTENNA 1
ANTENNA 2
DATA 1 (USER 1 TO N)+RETRANSMISSION DATA
DATA 1 (USER N+1 TO 2N)
DATA 2 (USER 1 TO N)+RETRANSMISSION DATA
DATA 2 (USER N+1 TO 2N)
TIME

What is claimed is:

1. A transmitting apparatus employing a MIMO (multi-input/multi-output) scheme of transmitting a plurality of data items for a same receiving apparatus using a plurality of antennas in parallel, the transmitting apparatus comprising:
   a mapping section that maps the plurality of data items to at least one of the plurality of antennas; and
   a transmitting section that transmits the plurality of data items using the at least one of the plurality of antennas to the receiving apparatus,
   wherein the mapping section generates a replica data item by replicating a specific data item of the plurality of data items, and maps the plurality of data items to the at least one of the plurality of antennas such that the specific data item and the replica data item are transmitted from different antennas at a same time.

2. The transmitting apparatus according to claim 1, wherein the specific data item comprises user data requiring a better communication quality than other user data.

3. The transmitting apparatus according to claim 1, wherein, in each antenna transmitting the specific data item and the replica data item, the transmitting section code division multiplexes different data from the specific data item upon the specific data item, and transmits the code division multiplexed data at the same time.

4. A communication terminal apparatus, comprising the transmitting apparatus according to claim 1.

5. A base station apparatus, comprising the transmitting apparatus according to claim 1.

6. A transmitting method employing a MIMO (multi-input/multi-output) scheme of transmitting a plurality of data items for a same receiving apparatus using a plurality of antennas in parallel, the transmitting method comprising:
   a mapping step of mapping the plurality of data items to at least one of the plurality of antennas; and
   a transmitting step of transmitting the plurality of data items using the at least one of the plurality of antennas to the receiving apparatus,
   wherein, in the mapping step, a replica data item is generated by replicating a specific data item of the plurality of data items, and the plurality of data items are mapped to the at least one of the plurality of antennas such that the specific data item and the replica data item are transmitted from different antennas at a same time.

\* \* \* \* \*